Sept. 19, 1967   J. W. CROWNOVER   3,342,655
COMPOSITION AND METHOD FOR ELECTRODING DIELECTRIC CERAMICS
Original Filed Dec. 3, 1962
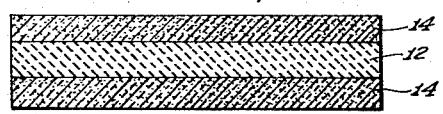
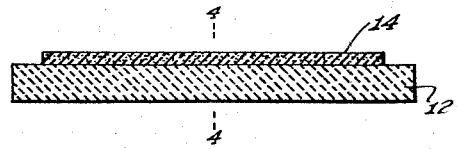
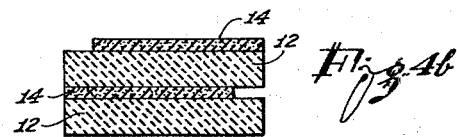
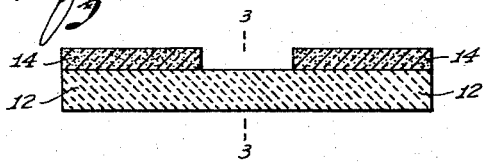
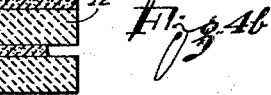
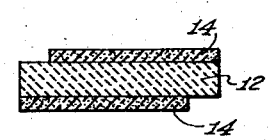
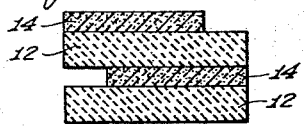
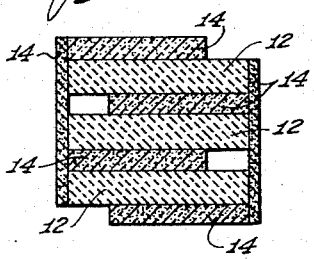
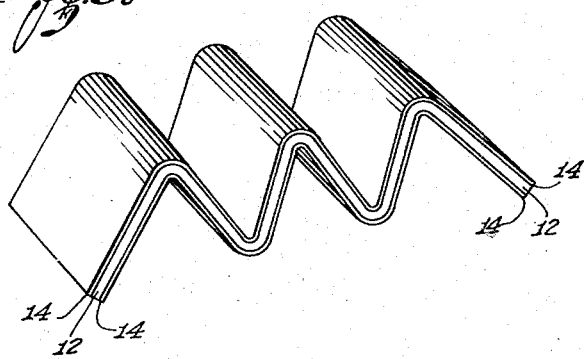
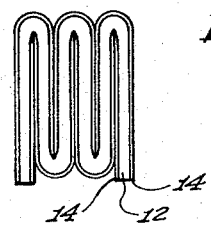
INVENTOR:
Joseph W. Crownover

United States Patent Office 3,342,655
Patented Sept. 19, 1967

3,342,655
COMPOSITION AND METHOD FOR ELECTRODING DIELECTRIC CERAMICS
Joseph Wirt Crownover, San Diego, Calif., assignor to Electro Materials Corporation, La Jolla, Calif.
Original application Dec. 3, 1962, Ser. No. 241,977, now Patent No. 3,223,494, dated Dec. 14, 1965. Divided and this application June 24, 1964, Ser. No. 377,564
13 Claims. (Cl. 156—89)

The present invention relates to dielectric ceramics and, more particularly to a multi-layer dielectric ceramic utilizing an improved electroding composition.

This is a divisional application of the patent application of Joseph W. Crownover, Ser. No. 241,977, filed Dec. 3, 1962 now Patent No. 3,223,494 for Composition and Method for Electroding Dielectric Ceramics.

In recent years, dielectric ceramics have achieved substantial acceptance in the electronic industry as a basic element in the production of small capacitors. A sheet of a dielectric ceramic is electroded and encapsulated with leads protruding to provide a small unitary structure which can be readily incorporated into small high frequency electronic circuits. At high frequency, capacitances in the range of micro-micro farads or pico farads are not uncommon and it has been found that dielectric ceramics provide these capacitances with great efficacy.

In the prior art, problems have been encountered in finding suitable electrode materials and in finding suitable methods for affixing electrodes to the ceramic dielectric which forms the basis of the capacitor. Typically, electrodes are soldered, welded, or otherwise attached to the ceramic, all of which are relatively expensive since the operation requires handling of the dielectric. Moreover, these electrodes may, under suitable environmental conditions, become detached from the ceramic body thereby changing the capacitance with undesirable results.

Small capacitors of higher values of capacitance have been attempted by stacking alternate layers of electrode and ceramic, and interconnecting alternate electrodes to produce a plurality of paralleled capacitors. However, this combination was difficult to fabricate and lacked mechanical rigidity, and was costly because of the need for handling the individual layers.

One promising approach discovered by the prior art researchers was the compounding of an electroding composition from the same ceramic material used in the dielectric. Some 40 to 60% by weight of a metallic powder or its oxide was added to the raw slurry and the mixture was fired in a reducing atmosphere. Such a process tends to be rather intricate and requires expensive, special equipment. For example, one suggested reducing atmosphere was hydrogen gas which requires a special explosion proof furnace.

A slurry consisting of raw, unfired ceramic includes a plastic or resin binder that is maintained in the liquid state by the addition of substantial amounts of a relatively volatile solvent. This slurry is then cast and the solvent is allowed to evaporate, leaving a relatively flexible, plastic, "green" ceramic ware.

An electroding material is made up by using this same ceramic slurry to which has been added a heavy concentration of a highly conductive metal, such as platinum in powder form. The electroding composition can then be sprayed, coated, or otherwise applied to the surfaces of the green ceramic and the resulting combination is then fired. In the firing process, the resin vehicle volatilizes, leaving the ceramic behind. During firing, the electrode layers coalesce into the ceramic body, forming a unitary, relatively homogeneous structure, which is conductive at the surfaces and is a dielectric in the center portion.

The electroding composition preferably contains approximately 85% metal, by weight, to 15%, by weight, of ceramic. More ceramic tends to reduce the conductivity and more powder reduces the structural strength.

In a preferred embodiment, multi-layer ceramic capacitors are produced by stacking layers of ceramic and electrode, which are prepared by coating ceramic sheets with electrode composition on one side and then stacking the sheets. Alternatively, single sheets are electroded on both surfaces and then are accordion-folded, resulting in a plurality of layers of dielectric ceramic separated by layers of electrode.

The novel properties of the electroding material permit interesting alternative structures within the present invention. Multiple dielectric layers, separated by electrode layers can be fired into a multi-layer, monolithic structure having higher values of capacitance.

It is therefore an object of the present invention to provide an improved process for electroding dielectric ceramics.

It is yet another object of the invention to provide a process for the production of multi-layer ceramic dielectric capacitors.

It is still a further object of the present invention to provide an improved multi-layer, dielectric ceramic capacitor.

The novel features which are believed to be characteristic of the invention both as to its organization and method of operation together with further objects and advantages thereof will be better understood from the following description considered with the accompanying drawings in which several embodiments are illustrated by way of example. It is specifically understood, however, that the drawings are for the purpose of illustration and description only and are not intended as a definition of the limits of the invention.

FIG. 1 is an end sectional view of a dielectric ceramic with electrodes applied according to the present invention.

FIG. 2 is an end sectional view of a dielectric ceramic layer with an electrode applied to one usrface thereof.

FIG. 3 comprises FIGS. 3a–3c of which;

FIG. 3a is an end sectional view of an alternative electrode configuration.

FIG. 3b is an end view of the layer of FIG. 3a cut along the line 3—3 and the halves stacked;

FIG. 3c is an end sectional view of a stack of dielectric layers;

FIG. 4 comprises FIG. 4a and 4b, of which;

FIG. 4a is an end sectional view of yet another electrode configuration;

FIG. 4b is an end view of the layer of FIG. 4a cut along line 4—4 and stacked;

FIG. 5 comprises FIGS. 5a, 5b and 5c of which;

FIG. 5a is an end sectional view of a dielectric ceramic layer to which electrodes are applied on both upper and lower surfaces;

FIG. 5b is a side sectional view of the dielectric ceramic of FIG. 5a along the line 5—5 in the direction of the appended arrows, in which the ceramic layer is accordion-folded to form a multi-layer dielectric ceramic, similar to that of FIG. 3c; and FIG. 5c is a side view of the ceramic FIG. 5b completely folded and flattened.

In practicing the present invention, there are many acceptable formulations for the dielectric ceramic all of which are suitable for use as capacitors. One such formulation is a mixture of barium titanate [$BaTiO_3$] and bismuth stannate [$Bi_2(SnO_3)_3$] in proportions of 96.4 mol percent and 3.6 mol percent, respectively.

These ingredients are prepared in a ball mill and are mixed with a vehicle of methyl methacrylate, sometimes known by its trademark name, Plexiglas, which is made fluid by the addition of a suitable solvent, such as ethylene dichloride.

This mixture thus formed of the ceramic and the vehicle is sometimes called a slurry which may be cast. When permitted to dry at a slightly elevated temperature, for example, 200° F. for a suitable period of time, depending upon the thickness of the layer, a dry flexible ceramic sheet also known as ware, is formed which can be easily handled. To aid in uniform drying, a vacuum may be employed to draw off the solvent.

Using this same ceramic slurry as a starting material, an electroding composition is formed by adding a highly conductive metal in powder form. One preferred metal is platinum, which is readily available as a powder. Finely powdered silver also may be used, as may any other highly conductive metal. According to the present invention, the electrode composition can range from 80 to 92% metal by weight, with the remainder being the ceramic.

In a preferred formulation, the ratio is 85% metal to 15% ceramic. The resistivity of the electrode increases appreciably if less than 80% of the mixture is metal. If the electroding composition contains less than 8% of ceramic, then the composition will lack cohesion and structural strength after firing, and would tend to crumble.

After the dielectric ceramic is cast, the electroding material can be applied to the surfaces either by dipping, painting, spraying, or through silk screen printing techniques. The electroding composition is also permitted to dry, preferably at an elevated temperature in a vacuum. The electroded ceramic is then fired in a kiln in which the temperature is raised in two hours, to 2450° F. This temperature is held for one hour and the kiln is then permitted to cool slowly for approximately five hours, during which the temperature is reduced at a rate of 200° per hour. At the end of the five hour period, the ceramic is taken from the kiln and permitted to cool down to room temperature.

The resulting product can be diced into small squares or rectangles whose capacitance is substantially proportional to the area.

Turning now to FIG. 1, there is shown a typical dielectric ceramic plate 10 with electrodes applied thereto. By affixing conductive leads to the electrode surfaces and encapsulating the structure, a ceramic capacitor is produced. As shown in the figure, a dielectric ceramic portion 12 is coated on the upper and lower surfaces with an electrode material 14.

For special applications in which more than one dielectric layer is used in the finished capacitor, an alternative electrode configuration is desirable. In FIG. 2, there is shown one such configuration wherein the electrode material 14 is applied to substantially all of the surface of the dielectric ceramic 12. A strip along one of the edges is left bare. If a plurality of such plates are provided with the electrode layer of successive layers abutting, then a stack could be fabricated with additional electroding composition 14 applied to the opposite edges of the stack to create a parallel electrical connection of the electrodes of alternate layers.

Turning now to FIG. 3a, there is shown a preferred electrode configuration which is particularly suited to the making of multi-layer stacks. As seen in FIG. 3a, the dielectric ceramic 12 has two strips of electrode 14 applied to the upper surface, separated by an uncoated strip. If now the ceramic layer is cut along line 3—3, the halves can be stacked as shown in FIG. 3b, and with the addition of other layers, a multi-layer stack, such as shown in FIG. 3c results. It will, of course, be apparent to those skilled in the art, that the figures are exaggerated to show detail and that the scale is oversize.

In FIG. 3c, the application of additional electrode material 14 to the edges is illustrated which provides the parallel interconnection of alternate electrodes. After firing, all apparent cavities will be filled by the flowing of the ceramic 12 to form a substantially homogenous mass.

FIG. 4a shows a similar electrode pattern which can form the basis of a stack after a single layer is cut down the middle along line 4—4. FIG. 4b illustrates the stacking of the resultant halves.

An alternative electroding method can be used to produce multi-layer stacks. Turning to FIG. 5a, there is shown a single layer of dielectric ceramic 12 to which has been applied upper and lower electroding layers 14. As seen in FIG. 5a, the upper layer abuts only the left hand edge as viewed in the figure while the layer abuts only the right hand edge. In FIG. 5c, the ceramic layer is shown after the strip has been folded in an accordion fashion to form the beginning of a multi-layer stack. The finished stack is shown in FIG. 5c, in which adjacent layers of dielectric 12 are separated by double thicknesses of electrode 14. While still in the "green" or unfired state, the stack can be trimmed at the folds so that a substantially flat, horizontal stack results. The edges are coated with electroding material 14 to connect the alternate electrodes in parallel.

Thus, there has been described an improved method of providing an electroding compound for a dielectric ceramic, and an improved method of providing a new multi-layer dielectric ceramic of monolithic structure, having unusual structural uniformity and homogeneity. This new multi-layer dielectric ceramic is easily fabricated in mass production. Multi-layer stacks, when fired become unitary bodies which are inseparable. By applying the electroding mixture of platinum and ceramic to the exposed outer layers only, some cost savings may be achieved by using a silver-ceramic mixture on all of the interior electrode layers. However, silver tends to disappear at the curing temperatures used when applied to the exposed outer layers, but in the internal, sealed layers, this is not a problem.

Adopting empirical rules, it would seem that satisfactory electroding mixtures, at least for the sealed, interior layers, could be prepared from the ceramic and any metal whose resistivity at normal temperature is less than 10 microhm-centimeters and whose boiling point is well above the maximum temperature achieved during the firing cycle. Exterior layers would probably require the metal to have a relatively low vapor pressure to prevent evaporation at temperatures below boiling but above melting.

The metals should not oxidize in the presence of oxygen, titanates, and stannates during the curing but should remain as metals throughout the process.

Although they have not yet been tried, chromium, cobalt, iridium, iron, molybdenum, nickel, rhodium and tungsten appear to be useful in electroding mixtures. Their melting points are all higher than the maximum curing temperatures recommended and their resistivity is 10 microhm-centimeters or less.

Other variations will be readily apparent to those skilled in the art and the scope of the invention should be limited only by the scope of the claims appended hereto.

What I claim as new is:
1. The method of producing an electroded dielectric ceramic comprising the steps of:
 (a) mixing a first slurry of a raw dielectric ceramic with a thermoplastic resin of the acrylate and methacrylate group, dissolved in a suitable solvent;
 (b) casting said liqudi slurry into a sheet and permitting said solvent to evaporate, thereby forming a sheet of raw ware;
 (c) mixing a second slurry having substantially the same composition as said first slurry;
 (d) mixing into said second slurry a finely powdered metal of high conductivity in the relative proportions of from 20% to 8% by weight of ceramic to from

80% to 92% by weight of powdered metal to produce a liquid electroding mixture;

(e) applying said electroding mixture to coat a surface of said sheet of raw ware and permitting the solvent to evaporate from said electroding mixture; and (f) firing said coated sheet of raw ware through a firing and cooling cycle of predetermined temperature relative to time.

2. The method of claim 1 in which the maximum firing temperature is 2450° F.

3. The method of claim 1 in which the powdered metal is platinum.

4. The method of claim 1 in which the electroding mixture is 85% by weight of platinum and 15% by weight of ceramic.

5. The method of claim 1 in which the powdered metal is chosen from metal elements having a resistivity less than 10 microhm-centimeter and boiling points above 1400° C.

6. The method of claim 1 in which the powdered metal is chosen from the group consisting of chromium, cobalt, iridium, iron, molybdenum, nickel, platinum, rhodium, and tungsten.

7. The step in the process of electroding a raw dielectric ceramic comprising:

mixing from 80% to 92% by weight of a finely powdered metal chosen from the group consisting of chromium, cobalt, iridium, iron, molybdenum, nickel, platinum, rhodium, silver, and tungsten with from 20% to 8% by weight of the raw dielectric ceramic in a liquid slurry made up of a thermoplastic resin of the acrylate and methacrylate group dissolved in a suitable solvent, to form an electroding mixture adapted to be applied to the surface of uncured dielectric ceramic sheets.

8. The method of producing a multi-layer dielectric ceramic comprising the steps of:

(a) mixing a first slurry of a raw dielectric ceramic with a thermoplastic resin of the acrylate and methacrylate group, dissolved in a suitable solvent;

(b) casting said liquid slurry into a sheet and permitting said solvent to evaporate, thereby forming a sheet of raw ware;

(c) mixing a second slurry having substantially the same composition as said first slurry;

(d) mixing into said second slurry a finely powdered metal of high conductivity in the relative proportions of from 20% to 8% by weight of ceramic to from 80% to 92% by weight of powdered metal to produce a liquid electroding mixture;

(e) applying said electroding mixture to coat a surface of said sheet of raw ware and permitting the solvent to evaporate from said electroding mixture;

(f) assembling a plurality of coated sheets of raw ware in a stack, each sheet prepared in accordance with steps (a) through (e) above;

(g) applying pressure to said stack of coated sheets of raw ware to compact the said stack; and (h) firing said stack of coated sheets of raw ware through a firing and cooling cycle of predetermined temperature relative to time.

9. The method of claim 8 in which the maximum firing temperature is 2450° F.

10. The method of claim 8 in which the powdered metal is platinum.

11. The method of claim 8 in which the electroding mixture is 85% by weight of platinum and 15% by weight of ceramic.

12. The method of claim 8 in which the powdered metal is chosen from metal elements having a resistivity less than 10 microhm-centimeter and boiling points above 1400° C.

13. The method of claim 8 in which the powdered metal is chosen from the group consisting of chromium, cobalt, iridium, iron, molybdenum, nickel, platinum, rhodium, and tungsten.

No references cited.

EARL M. BERGERT, *Primary Examiner.*

M. L. KATZ, *Assistant Examiner.*